United States Patent [19]
Balje et al.

[11] 3,713,294
[45] Jan. 30, 1973

[54] AUXILLIARY POWER UNIT AND REGENERATIVE EXHAUST REACTOR

[75] Inventors: Otto Erich Balje, Los Angeles, Calif.; Constant L. Bouchard, Birmingham, Mich.; James Knowles, Bloomfield, Mich.; Dimitri Kosacheff, New Boston, Mich.; Emil A. Pulick, Livonia, Mich.; Armen Topouzian, Birmingham, Mich.

[73] Assignee: Ford Motor Co., Dearborn, Mich.

[22] Filed: Aug. 12, 1971

[21] Appl. No.: 171,229

[52] U.S. Cl...............60/303, 60/39.51 H, 60/59 T, 60/307, 62/402
[51] Int. Cl..............................................F01n 3/14
[58] Field of Search.....60/303, 307, 320, 317, 39.51, 60/11, 39.18 C, 57 T; 62/402

[56] References Cited

UNITED STATES PATENTS

| | | | |
|---|---|---|---|
| 3,666,422 | 5/1972 | Rossel | 60/303 |
| 3,106,821 | 10/1953 | Ridgeway | 60/307 |
| 2,729,073 | 1/1956 | Nielsen et al | 62/402 |
| 2,928,261 | 3/1960 | Sampietro | 62/402 |
| 2,573,289 | 10/1951 | Traupel | 60/39.18 C |

FOREIGN PATENTS OR APPLICATIONS

| | | | |
|---|---|---|---|
| 627,514 | 3/1936 | Germany | 60/59 T |

Primary Examiner—Carlton R. Croyle
Assistant Examiner—Warren Olsen
Attorney—Keith L. Zerschling et al.

[57] ABSTRACT

A housing contains a burner for combusting the exhaust gases of a reciprocating internal combustion engine to increase the heat content thereof. Combustion products from the burner pass through a regenerator that transfers heat therefrom to inducted air for a turbine. The heated air passes through the turbine to produce useful work and then enters the burner to mix with the exhaust gases of the reciprocating engine. An alternator mounted within the housing is driven by the turbine to supply electrical power. An air cycle air conditioning system also is mounted within the housing and its compressor is driven by the turbine.

20 Claims, 3 Drawing Figures

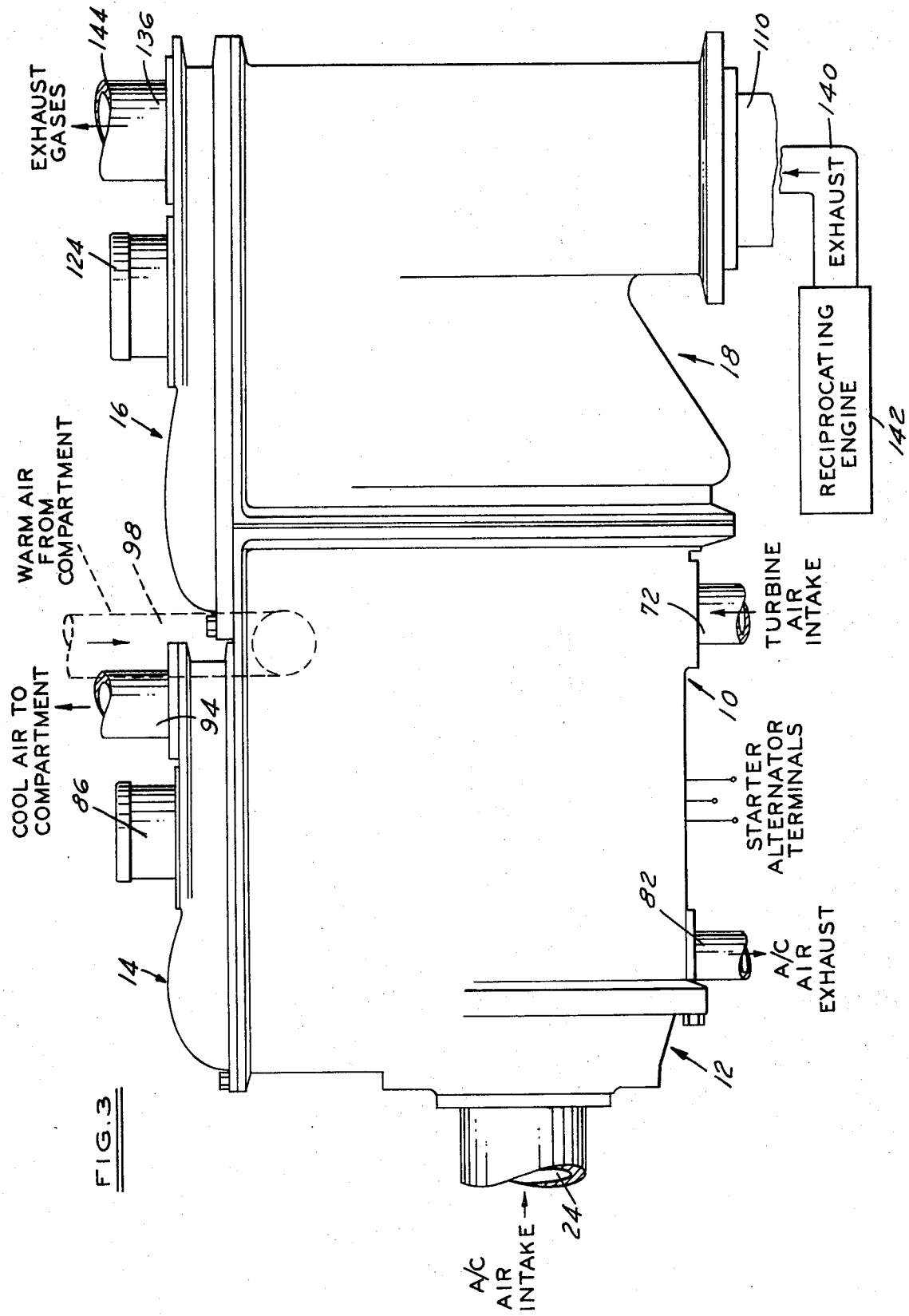

AUXILLIARY POWER UNIT AND REGENERATIVE EXHAUST REACTOR

BACKGROUND OF THE INVENTION

Increasing electrical and air conditioning loads and the loads required by other automotive accessories are placing heavy demands upon automotive engines. Difficulties in handling these loads are compounded by the decreasing average vehicle speed in urban and suburban areas because the large alternator and air conditioning compressor necessary to handle load requirements at these low engine speeds absorbs excessive power at turnpike speeds. In addition, continually expanding anti-smog legislation imposes increasing restrictions on automotive exhaust emissions and the varying power loads required by accessories severely complicates the construction and operation of emission reducing components.

One technique of reducing the quantity of oxides of nitrogen in the exhaust gases of reciprocating internal combustion engine involves operating the engine on an excessively rich fuel-air mixture. In addition to decreasing peak combustion temperature, which inherently decreases nitrogen oxide formation, such excessively rich mixtures also form considerable amounts of reducing agents such as carbon monoxide that further decrease the quantity of nitrogen oxides in the exhaust gases. The rich mixture, however, results in increased unburned hydrocarbons that along with the carbon monoxide must be eliminated from the exhaust gases. Moreover, engine fuel economy deteriorates considerably.

The prior art has proposed recovering the energy in such exhaust gases by further combusting the exhaust gases in a gas turbine engine. In some cases, the exhaust gases are mixed with additional air and perhaps fuel, the mixture is ignited, and the combustion products thereof are applied to the turbine wheel of the turbine engine. A more recent proposal comprises blending the exhaust gases of a reciprocating engine with a portion of the combustion products leaving a gas turbine combustor so the excess oxygen content and high temperature of the turbine combustion products promotes oxidation of the carbon monoxide and unburned hydrocarbons of the reciprocating engine exhaust gases. The remaining portion of the combustion products drives the turbine wheel and then mixes with the exhaust gases of the reciprocating engine. A regenerator transfers heat from the mixed exhaust gases to the air inducted into the turbine engine.

SUMMARY OF THE INVENTION

The auxiliary power unit of this invention provides an alternate technique of utilizing the unburned hydrocarbons and carbon monoxide in the exhaust gases of an internal combustion engine typically of the reciprocating or turbine type to produce power for driving vehicle accessories. A housing for the power unit contains a turbine assembly that includes an air induction passage, a heat transfer device receiving the inducted air and a turbine wheel receiving the inducted air from the heat transfer device. A reactor receives the air leaving the turbine wheel and also receives the exhaust gases of the engine. In the reactor, the air reacts with the exhaust gases to increase the heat content of the resulting gases that then pass into the heat transfer device which transfers heat therefrom to inducted air. Heated air leaving the heat transfer device imparts some of its energy to the turbine wheel but is still at a relatively high temperature when it enters the reactor and thereby assists in initiating and maintaining the reaction taking place therein.

The reaction in the reactor usually is a flame producing combustion of the oxidizable components of the exhaust gases. Supplemental fuel can be added to the reactor to initiate such combustion or sustain it at proper levels when necessary. No other combustion occurs in the power unit during normal operation. Some installations might require adding fuel to the air leaving the heat transfer device and combusting the resulting mixture before it enters the turbine wheel for starting purposes, but such combustion preferably is terminated immediately after starting is achieved. The flame combustion in the reactor can be supplemented or replaced by a flameless exothermic catalytic oxidation or reduction of exhaust gas components.

Power can be removed from the turbine wheel by a variety of techniques. A highly efficient, compact arrangement comprises mounting an alternator within the housing and attaching the turbine wheel directly to its rotor. The alternator can serve also as an electric starter for the power unit, and other types of dynamoelectric machines can be substituted for the alternator. An air cycle fluid cooling mechanism also can be located in the housing. The air pump for the fluid cooling mechanism is driven directly from the turbine wheel of the turbine assembly at the high speeds essential to efficient operation. In the cooling mechanism, air expands through an air expansion device, passes through a heat transfer device that transfers heat from the fluid to the expanded air, and finally is pumped out of the housing by the air pump. The cooled fluid can be air that is supplied to a passenger compartment of the vehicle. A disc shaped turbine wheel having compressor blades that serve as the air pump on one radial surface conveniently has expander blades that serve as a rotating expander on the other radial surface.

Rotating regenerators are preferred for the heat transfer devices of both the turbine assembly and the fluid conditioning system. High operating versatility is achieved by driving the regenerators with individual electric motors. The regenerator for the turbine assembly is made of ceramic or other high temperature materials while the regenerator for the air cycle can be made of less expensive materials having lower temperature requirements.

BRIEF DESCRIPTION OF THE DRAWINGS

FIG. 3 is a schematic illustration showing the external connections to the power unit.

DETAILED DESCRIPTION

Figure 1:
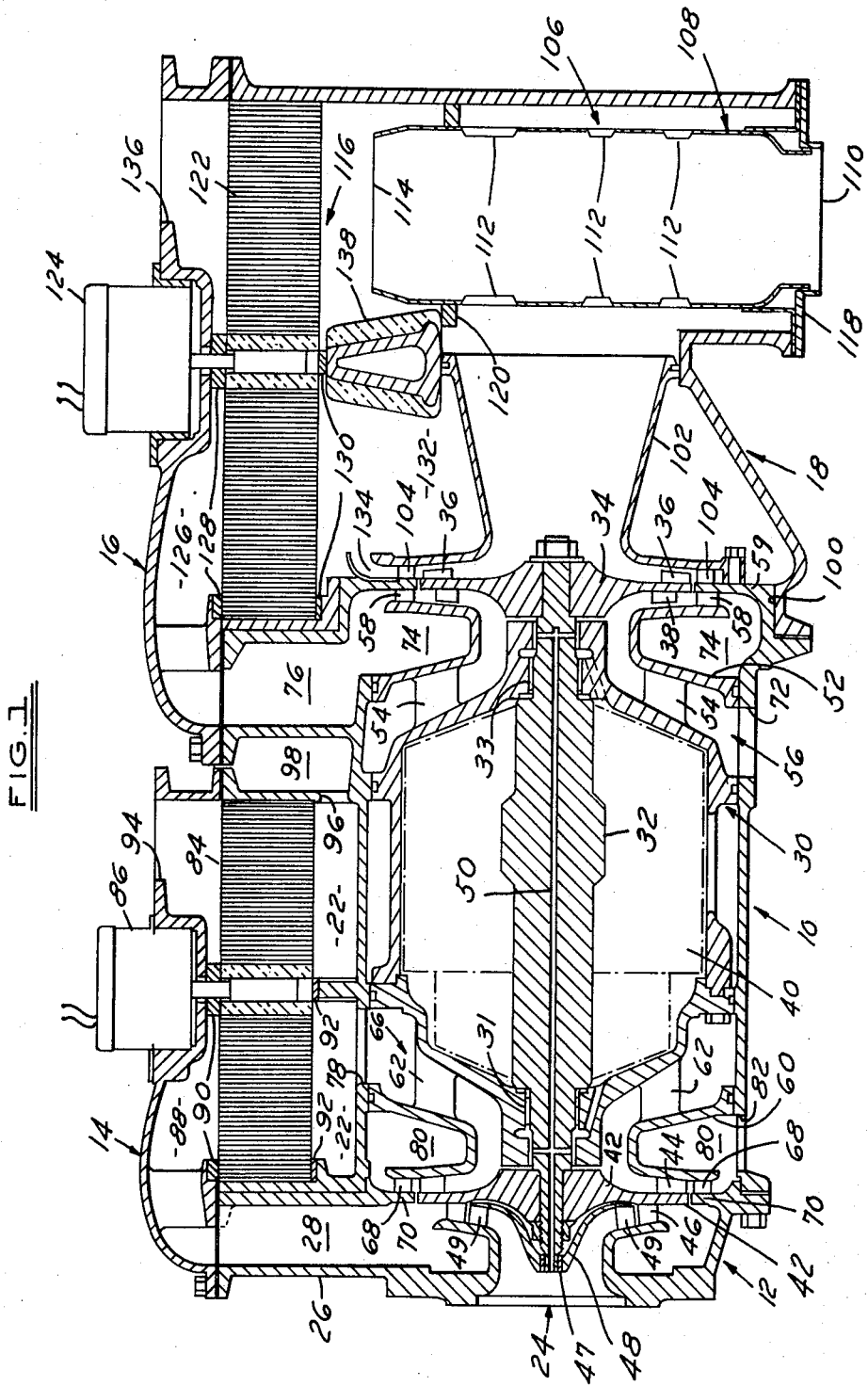
FIG. 1 is a sectioned elevation of the housing of the power unit of this invention taken along the axis of the shaft of the turbine assembly. The Figure shows the regenerators for the cooling cycle and the turbine assembly, an alternator connected directly to the turbine wheel of the turbine assembly, and a mixer-burner assembly for blending the heated air leaving the turbine wheel with the exhaust gases from the reciprocating engine and burning the blend.
Figure 2:
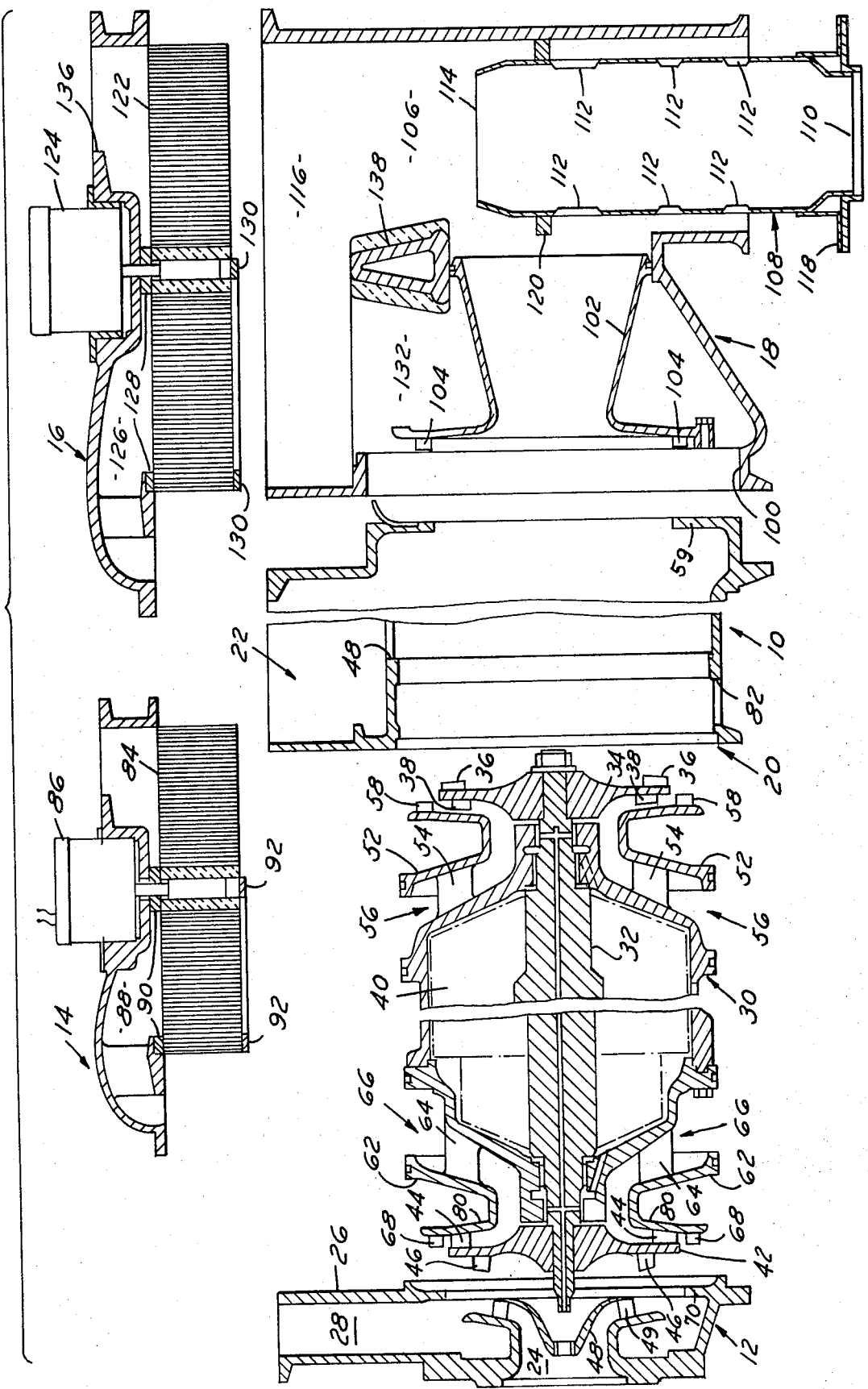
FIG. 2 is an exploded view of FIG. 1 to illustrate more clearly the different components used in the power unit.

Referring primarily to FIGS. 1 and 2, the housing of the power unit of this invention is made up of a turbine and alternator casing 10, an air cycle intake casing 12, an air cycle regenerator cover 14, a turbine regenerator cover 16 and a mixer-burner casing 18. A cylindrical opening 20 extends horizontally through turbine casing 10 and a cylindrical space 22 extends into the upper surface of casing 10 for a short distance.

The rear surface of intake casing 12 is adapted for mounting against the left side of turbine casing 10. An air inlet 24 is located in the front surface of intake casing 12 and an upwardly extending portion 26 of casing 12 contains an air outlet 28.

A frame assembly 30 fits in opening 20 of casing 10. Frame assembly 30 contains bearing 31 and 33 that rotatably support a shaft 32. A turbine wheel 34 is attached to the right end of shaft 32. Turbine wheel 34 is disc shaped and it has a plurality of turbine blades 36 on its right surface and a plurality of compressor blades 38 on its left surface. An enlarged portion of frame assembly 30 surrounds a starter-alternator assembly 40 consisting of a rotor and a stator. The rotor of alternator assembly 40 is attached to shaft 32.

A second disc shaped turbine wheel 42 is attached to the left end of shaft 32. Turbine wheel 42 has a plurality of compressor blades 44 on its right radial surface and a plurality of turbine blades 46 on its left radial surface. A support bearing 47 attached by a shroud 48 to intake casing 12 fits on the left end of shaft 32 outboard of turbine wheel 42. A plurality of inlet vanes 49 space shroud 48 from casing 12.

Shaft 32 can contain an axial passage 50 connecting air inlet 24 with the left side of bearing 31 and the right side of bearing 33. Passage 50 maintains the air pressure at the bearings substantially at atmospheric to prevent excessive lubricant atomization and induction into the gas streams.

An annular member 52 having a U-shaped cross section is supported from frame assembly 30 by struts 54 to define a bell-shaped air induction passage 56 leading to compressor blades 38. Guide vanes 58 attached to the right side of annular member 52 seat against an inwardly projecting flange 59 connected to the right side of casing 10 when frame assembly 30 is installed in casing 10. A similar construction exists at the left end of the frame assembly where an annular member 60 having a U-shaped cross section is attached by struts 62 to the frame assembly to form a bell-shaped passage 66 leading to compressor blades 44 of turbine wheel 42. Guide vanes 68 fastened to the left side of annular member 62 seat against an inwardly extending flange 70 of intake casing 12 when casing 12 is fastened to casing 10.

Installation of frame assembly 30 into casing 10 and attachment of casing 12 to casing 10 aligns the rim of turbine wheel 34 with flange 59 and also aligns the rim of turbine wheel 42 with flange 70. Passage 56 communicates with the atmosphere through an opening 72 in the lower portion of casing 10 and the open space 74 of annular member 52 connects passage 56 with an upwardly directed passage 76. At the left side of the assembly, passage 66 communicates with cylindrical space 22 through an opening 78 in the floor separating cylindrical space 22 from cylindrical opening 20. The space 80 defined by annular member 62 communicates with the atmosphere through an opening 82 in the lower portion of casing 10.

A disc shaped regenerator 84 for the air cycle cooling system is mounted in cylindrical space 22. Regenerator 84 is driven by an electric motor 86 that is fastened to regenerator cover 14. The arcuate portion of cover 14 defines a flow passage 88 that connects air outlet 28 of intake casing 12 with the upper surface of the front sector of regenerator 84. A rubbing seal 90 surrounds the upper surface of the front sector of regenerator 84 and a similar rubbing seal 92 surrounds the lower surface of the front sector.

The lower surface of the front sector of regenerator 84 communicates through opening 78 with passage 66. An opening 94 in the rear portion of regenerator cover 14 communicates with the upper surface of the rear sector of regenerator 84. An opening 96 in the right portion of the upstanding wall defining cylindrical space 22 connects the lower surface of the rear portion of regenerator 84 with a space 98.

Mixer-burner casing 18 has a cylindrical opening 100 on its left surface that receives the right end of casing 10. A nozzle 102 has a set of vanes 104 on its substantially planar left surface that seat against flange 59 of casing 10. The diverging portion of nozzle 102 extends to the right toward a cylindrical space 106 extending into casing 18 from its lower surface.

A mixer-burner assembly 108 is positioned in cylindrical space 106. Assembly 108 has an inlet 110 that is positioned at the lower surface of casing 18 and a plurality of smaller inlets 112 spaced along its cylindrical periphery to connect the diverting portion of nozzle 102 with the interior of the mixer-burner assembly. An outlet 114 is located on the upper surface of the mixer-burner assembly to connect its interior with an upwardly facing cylindrical space 116 formed in the top of casing 18. Flanges 118 and 120 located respectively at the bottom and near the top of assembly 108 position the assembly in casing 18.

A regenerator 122 for the turbine assembly is located in cylindrical space 116. Regenerator 122 is connected to and driven by an electric motor 124 that is fastened to turbine cover 16. The arcuate front portion of cover 16 defines a flow passage 126 that connects passage 76 with the upper surface of the front sector of regenerator 122. Appropriate seals 128 and 130 surround the respective upper and lower surfaces of the front sector of regenerator 122. The lower surface of the front sector communicates with a space 132 defined in part by the exterior of nozzle 102. A passage 134 defined by the substantially planar left surface of nozzle 102 and the right surface of flange 59 connects space 132 via turbine blades 36 with the interior of nozzle 102.

Outlet 114 of mixer-burner assembly 108 is positioned a short distance below the lower surface of the rear sector of regenerator 122. The upper surface of the rear sector of regenerator 122 communicates with the atmosphere through an opening 136.

A portion of seal 130 seats on the upper surface of an A section 138 that is attached to or integral with casing 18. Appropriate insulation can be attached to the exterior surfaces of A section 138 and on the exterior of nozzle 102. The interior of A section 138 provides a restricted flow path from passage 126 to combustion space 132 and the relatively small amounts of air flowing therethrough assists in cooling the A section.

Referring to FIG. 3, appropriate conduits are attached to air inlet 24, air exhaust opening 82, opening 94 and space 98 of the fluid conditioning cycle, and turbine air inlet opening 72. A conduit 140 conducts the exhaust gases of a reciprocating internal combustion engine 142 to inlet 110. Another conduit 144 is connected to opening 136 to carry away the gases leaving the right sector of regenerator 122.

The power unit is started in the following manner. Electrical power is supplied to starter-alternator assembly 40 to begin rotation of turbine wheel 34. Electrical power also is supplied to motor 124 to begin rotation of regenerator 122. Hot exhaust gases from a reciprocating engine enter inlet 110 of mixer-burner assembly 108 and pass through the right sector of regenerator 122 where the gases give up heat to the regenerator.

Rotation of turbine wheel 34 begins drawing air through air induction passage 56, space 74, passage 76, passage 126, the left sector of regenerator 122, space 132 and past turbine blades 36. The air flows through the diverging portion of nozzle 102 and passes through inlets 112 into assembly 108. Rotating regenerator 122 transfers sufficient heat to the air passing through the left sector of the regenerator for the heated air passing turbine blades 36 to impart self-sustaining power to turbine wheel 24. When the self-sustaining power is achieved, the electrical power is cut off from the starter-alternator assembly.

When the exhaust gases from the reciprocating engine are insufficient to provide self-sustaining power, supplemental fuel is introduced into mixer-burner assembly 108 to mix with the exhaust gases and the air entering inlets 112. Conventional fuel nozzles located in assembly 108, nozzle 102, or the conduit connected to inlet 112 can be used to introduce the supplemental fuel. The mixture is combusted in the mixture-burner assembly and regenerator 122 transfers heat from the combustion products to the air passing through the left sector of the regenerator. Starting assistance also can be provided by injecting fuel into passage 126 and combusting the fuel-air mixture as it emerges from the left sector of regenerator 122 in the manner described in Topouzian U.S. Pat. No. 3,563,031. Alternatively, the starting fuel can be supplied to a conventional combustion chamber that receives air from the lower surface of the left sector of regenerator 122.

Once starting is achieved, the fuel being supplied to the air inducted through passage 56 is stopped and turbine wheel 34 is powered only by the heat supplied to the inducted air by regenerator 122. The heated air leaving turbine blades 36 passes through small inlets 112 of mixer-burner assembly 108 to promote highly efficient combustion of combustible components in the exhaust gases from the reciprocating engine. Turbine wheel 34 and the components connected thereto preferably operate at a substantially constant speed and sufficient fuel is supplied to burner assembly 108 to sustain that speed regardless of the operating mode of the reciprocating engine. Turbine wheel 34 drives the rotor of alternator assembly 40 to produce electrical energy in the conventional manner.

To operate the air conditioning cycle, electric motor 86 is started to rotate regenerator 84 and a supplemental fan (not shown) capable of moving a fluid such as air from a passenger compartment through the right sector of regenerator 84 also is started. Turbine wheel 42 is rotated at the speed of turbine wheel 34 and the compressor blades 44 on the right surface of turbine wheel 42 draw air into air inlet 24 through passage 28, passage 88, the right sector of regenerator 84, and passage 66. The air moved by compressor blades 44 exhausts from opening 82.

Air entering inlet 24 is expanded by turbine blades 46 located on the left radial surface of turbine wheel 42. Expansion lowers the temperature of the air and the cool air passes through passage 28 and passage 88 to the regenerator where regenerator rotation transfers the heat from the fluid passing through its right sector to the cool air passing through its left sector. Air leaving the left sector of the regenerator passes through passage 66, past compressor blades 44, and finally exhausts through opening 82.

Any or all of vanes 49, 68 and 104 can be variable to provide desired speed and load flexibility. Speed and load requirements also can be controlled by varying the rotational speed of regenerator 122 with appropriate control circuitry for motor 124. Regenerator 122 can be impregnated with a catalyst capable of converting any desirable components in the gases passing through its right sector to more innocuous materials. A very useful arrangement involves impregnating the regenerator with a catalyst capable of reducing oxides of nitrogen, so that the gases exiting from conduit 144 have extremely low levels of unburned hydrocarbons, carbon monoxide and oxides of nitrogen.

The reciprocating engine can be operated with conventional fuel-air mixtures or with varying degrees of excessively rich mixtures; conventional and slightly enriched mixtures usually require fuel additions to mixer-burner assembly 108 while greatly enriched mixtures can obviate such fuel additions.

Thus this invention provides an auxiliary power unit that improves the quality of the exhaust gases from a reciprocating engine and produces useful work therefrom. The power unit conveniently is packaged in a single housing that contains a turbine assembly, a starter-alternator assembly and an air cycle air conditioning system.

We claim:

1. An auxiliary power unit for an internal combustion engine comprising
    a housing,
    a turbine assembly in said housing, said turbine assembly including air induction means for inducting air into the turbine assembly, heat transfer means receiving the inducted air, and a turbine means receiving the gases from the heat transfer means, and
    reactor means in said housing for reacting the gases leaving said turbine means with the exhaust gases of said engine to increase the heat content of the resulting gases, said resulting gases passing into said heat transfer means, said heat transfer means transferring heat from the resulting gases to the inducted air.

2. The power unit of claim 1 comprising a dynamoelectric machine having a rotor and stator mounted is said housing and a shaft directly connecting said rotor of said dynamoelectric machine with said turbine means.

3. The power unit of claim 2 in which the heat transfer means is a rotating regenerator that is driven by an electric motor.

4. The power unit of claim 3 in which the reactor means comprises a mixer means for mixing the air leaving said turbine means with the exhaust gases of said engine and a burner means for combusting the mixture produced by said mixer means.

5. The power unit of claim 4 in which the rotating regenerator is disc shaped and the burner means includes a cylindrical container having an outlet at one end and an inlet at the opposite end, said outlet being located adjacent one sector of the regenerator.

6. The power unit of claim 5 in which the inlet of the cylindrical container receives the exhaust gases from the engine and the mixer means comprises a plurality of openings in the cylindrical surface of the container, said openings conducting the air leaving the turbine means into the cylindrical container where the air mixes with the exhaust gases.

7. The power unit of claim 6 in which the turbine means is a disc shaped turbine wheel having turbine blades on one radial surface and compressor blades on the other radial surface.

8. The power unit of claim 7 comprising a fluid cooling mechanism mounted in said housing, said fluid cooling mechanism including
an air pumping means connected to said turbine means, an air expansion means for expanding the air pumped by said air pumping means, a heat transfer means for transferring heat to the expanded air leaving said air expansion means, and
fluid flow means for flowing fluid through said heat transfer means, said heat transfer means transferring heat from said fluid to said expanded air.

9. The power unit of claim 8 in which the heat transfer means of said cooling mechanism is a rotating regenerator that is driven by an electric motor.

10. The power unit of claim 9 in which the fluid cooling mechanism comprises a second disc shaped turbine wheel attached to said shaft, said air pumping means comprising a plurality of compressor blades located on one radial surface of said second turbine wheel and said air expansion means comprising a plurality of turbine blades located on the other radial surface of said second turbine wheel.

11. The power unit of claim 1 in which the heat transfer means is a rotating regenerator that is driven by an electric motor.

12. The power unit of claim 1 in which the reactor means comprises a mixer means for mixing the air leaving said turbine means with the exhaust gases of said engine and a burner means for combusting the mixture produced by said mixer means.

13. The power unit of claim 1 in which the turbine means is a disc shaped turbine wheel having turbine blades on one radial surface and compression blades on the other radial surface.

14. The power unit of claim 1 comprising a fluid cooling mechanism mounted in said housing, said fluid cooling mechanism including
an air pumping means connected to said turbine means, an air expansion means for expanding the air pumped by said air pumping means, a heat transfer means for transferring heat to the expanded air leaving said expansion means, and
fluid flow means for flowing fluid through said heat transfer means, said heat transfer means transferring heat from said fluid to said expanded air.

15. The power unit of claim 14 in which the heat transfer means of said cooling mechanism is a rotating regenerator that is driven by an electric motor.

16. The power unit of claim 14 in which the fluid cooling mechanism comprises a second disc shaped turbine wheel attached to said shaft, said air pumping means comprising a plurality of compressor blades located on one radial surface of said second turbine wheel and said air expansion means comprising a plurality of turbine blades located on the other radial surface of said second turbine wheel.

17. A system for reducing the amount of undesirable components in the exhaust gases of an internal combustion engine comprising
a gas turbine assembly including air induction means for inducting air into the gas turbine assembly, heat transfer means for transferring heat to the inducted air, and turbine means connected to said heat transfer means by a passage means for producing work from the heated gases leaving the heat transfer means,
mixer means for mixing the gases leaving the turbine means with the exhaust gases of the engine, and
reactor means for reacting the mixed gases from the mixer means to increase the heat content of the resulting gases, said resulting gases passing into said heat transfer means, said heat transfer means transferring heat from the resulting gases to the air inducted into the turbine assembly.

18. The system of claim 17 in which the heat transfer means comprises a disc shaped regenerator and an electric motor for driving said regenerator.

19. The system of claim 18 in which the reactor means exothermically oxidizes the undesirable components in the exhaust gases of the reciprocating engine.

20. The system of claim 19 in which the regenerator contains a catalyst for reducing oxides of nitrogen in the resulting gases form the reactor means.

* * * * *